United States Patent
Schaal

(10) Patent No.: US 8,572,968 B2
(45) Date of Patent: Nov. 5, 2013

(54) SOLAR THERMAL POWER PLANTS

(75) Inventor: Michael Schaal, Kiriat Bialik (IL)

(73) Assignee: Siemens Concentrated Solar Power Ltd., Beit Shemesh (IL)

( * ) Notice: Subject to any disclaimer, the term of this patent is extended or adjusted under 35 U.S.C. 154(b) by 600 days.

(21) Appl. No.: 12/733,590

(22) PCT Filed: Sep. 11, 2008

(86) PCT No.: PCT/IL2008/001220
§ 371 (c)(1),
(2), (4) Date: Mar. 10, 2010

(87) PCT Pub. No.: WO2009/034577
PCT Pub. Date: Mar. 19, 2009

(65) Prior Publication Data
US 2010/0212318 A1    Aug. 26, 2010

Related U.S. Application Data

(60) Provisional application No. 60/960,016, filed on Sep. 11, 2007.

(51) Int. Cl.
*B60K 16/00*    (2006.01)

(52) U.S. Cl.
USPC ........................................ 60/641.8

(58) Field of Classification Search
USPC .................. 60/641.8, 641.11, 641.15
See application file for complete search history.

(56) References Cited

U.S. PATENT DOCUMENTS

| 3,951,129 A | * | 4/1976 | Brantley, Jr. | 126/649 |
| 4,072,182 A | * | 2/1978 | Cheng | 122/406.4 |
| 4,129,117 A | * | 12/1978 | Harvey | 126/655 |

(Continued)

FOREIGN PATENT DOCUMENTS

| DE | 19651645 A1 | 6/1998 |
| DE | 19652349 A1 | 6/1998 |
| EP | 0526816 A1 | 2/1993 |
| FR | 2450363 | 9/1980 |

OTHER PUBLICATIONS

Kane, M. et al., "Approche de Conception et d' optimisation de Centrale Solaire Intégrée à Cycle Combineé Inspirée de la Méthod du Pincement (Partie 1: Paliers de Recuperation)", Revue Generale de Thermique, Elsevier Editions Scientifiques et Medicales, Paris, France, vol. 38, No. 6, pp. 501-511, Jun. 1, 1999.

Mueller, M. et al., "Solare Farmkraftwerke und Direktverdampfung in Kollektoren", Forschungsverbund Sonnenenergie, pp. 57-64, XP0006647082, Dec. 31, 1993.

International PCT Search Report, PCT/IL2008/001220, 3 pages, Mailed Mar. 23, 2009.

*Primary Examiner* — Thomas Denion
*Assistant Examiner* — Philip Eklem
(74) *Attorney, Agent, or Firm* — King & Spalding L.L.P.

(57) ABSTRACT

A solar thermal power plant is provided comprising a solar collection system and a steam-electric power plant. The solar collection system comprises one or more tube radiation absorbers containing a thermal fluid therewithin, the system being configured to heat the thermal fluid by passing the thermal fluid through the one or more tube radiation absorbers while the absorbers are irradiated with solar radiation. The steam-electric power plant comprises an intermediate-pressure steam turbine, a low-pressure steam turbine, at least one additional steam turbine having an inlet pressure higher than that of the intermediate-pressure steam turbine, and piping containing a working fluid. Each turbine is associated with a heat exchange system adapted to transfer heat from the thermal fluid to the working fluid.

20 Claims, 8 Drawing Sheets

(56) References Cited

U.S. PATENT DOCUMENTS

| | | | |
|---|---|---|---|
| 4,858,562 A * | 8/1989 | Arakawa et al. | 122/7 R |
| 4,915,062 A * | 4/1990 | Dolezal | 122/406.5 |
| 5,182,912 A * | 2/1993 | Parker et al. | 60/641.8 |
| 5,588,400 A * | 12/1996 | Stefan et al. | 122/406.1 |
| 6,173,679 B1 * | 1/2001 | Bruckner et al. | 122/406.4 |
| 6,422,017 B1 * | 7/2002 | Bassily | 60/653 |
| 6,742,336 B2 * | 6/2004 | Itou et al. | 60/646 |
| 7,171,812 B2 * | 2/2007 | Schubert | 60/641.15 |
| 7,296,410 B2 * | 11/2007 | Litwin | 60/641.12 |
| 2007/0157614 A1 | 7/2007 | Goldman | 60/641.15 |

* cited by examiner

| Location | Mass flow rate (ton/hr) | Enthalpy (kJ/kg) | Temperature (°C) | Pressure (bar) | Steam quality |
|---|---|---|---|---|---|
| A | 3262.6 | | 395.0 | | |
| B | 160.9 | | 395.0 | | |
| C | 2954.3 | | 395.0 | | |
| D | 2954.3 | | 389.5 | | |
| E | 2954.3 | | 356.8 | | |
| F | 2954.3 | | 352.0 | | |
| G | 160.9 | | 395.0 | | |
| H | 160.9 | | 300.0 | | |
| I | 147.4 | | 395.0 | | |
| J | 147.4 | | 235.0 | | |
| K | 160.6 | 2750.0 | 280.0 | 62.0 | 1 |
| L | 160.6 | 3120.3 | 377.0 | 60 | 1 |
| M | 136.9 | 3207.3 | 379.0 | 17.35 | 1 |
| N | 106.2 | 2305.6 | 37.7 | 0.065 | 0.891 |
| O | 25.4 | 2836.5 | 330.0 | 100.0 | 1 |
| P | 15.2 | 2937.3 | 295.0 | 42.8 | 1 |
| Q | 8.5 | 2809.4 | 215.0 | 19.3 | 1 |
| R | 7.9 | 3096.1 | 320.8 | 10.2 | 1 |
| S | 9.6 | 2902.5 | 220.5 | 4.2 | 1 |
| T | 6.5 | 2683.9 | 105.1 | 1.21 | 1 |
| U | 6.7 | 2518.3 | 75.5 | 0.39 | 0.95 |
| V | 186.0 | 2872.2 | 377.0 | 150.0 | |
| W | 186.0 | 2671.1 | 353.0 | 172.5 | 1 |
| X | 186.0 | | 351.0 | | |
| Y | 186.0 | | 308.9 | | |
| Z | 186.0 | | 252.6 | | |
| AA | 186.0 | | 206.1 | | |
| BB | 186.0 | | 178.0 | | |
| CC | 25.4 | | 262.2 | | |
| DD | 40.6 | | 216.1 | | |
| EE | 49.1 | | 188.0 | | |
| FF | 130.3 | | 144.9 | | |
| GG | 130.3 | | 102.0 | | |
| HH | 130.3 | | 72.0 | | |
| II | 130.3 | | 39.7 | | |
| JJ | 9.6 | | 112.0 | | |
| KK | 16.1 | | 82.0 | | |
| LL | 22.8 | | 49.7 | | |
| MM | 1.3 | 2777 | | | |

FIG. 3B

| Location | Pressure (bar) | Temperature (°C) | Flow rate (kg/sec) |
|---|---|---|---|
| A | 24.9 | 395 | 2260 |
| B | 12.2 | 395 | 379 |
| C | 12.2 | 395 | 134 |
| D | 12.0 | 233 | 134 |
| E | 12.0 | 268 | 379 |
| F | 12.2 | 395 | 244 |
| G | 12.0 | 287 | 244 |
| H | 12.0 | 320 | 2260 |
| I | 42.0 | 323 | 2260 |
| J | 36.5 | 323 | 2260 |
| K | 24.9 | 395 | 1882 |
| L | 12.5 | 381 | 1882 |
| M | 12.2 | 346 | 1882 |
| N | 12.0 | 330 | 1882 |
| O | 161 | 269 | 176 |
| P | 158 | 341 | 176 |
| Q | 153 | 344 | 176 |
| R | 150 | 382 | 176 |
| S | 61.8 | 277 | 167 |
| T | 61.8 | 277 | 167 |
| U | 60.0 | 379 | 142 |
| V | 15.8 | 223 | 142 |
| W | 15.0 | 379 | 112 |
| X | 0.069 | 38.7 | 112 |
| Y | 0.069 | 38.7 | 112 |
| Z | 0.069 | 38.7 | 134 |
| AA | 0.069 | 38.7 | 134 |
| BB | 9.02 | 39.9 | 134 |

| Location | Pressure (bar) | Temperature (°C) | Flow rate (kg/sec) |
|---|---|---|---|
| CC | 8.84 | 95.1 | 134 |
| DD | 8.57 | 141 | 134 |
| EE | 8.57 | 173 | 176 |
| FF | 169 | 178 | 176 |
| GG | 164 | 197 | 176 |
| HH | 164 | 208 | 176 |
| II | 164 | 253 | 176 |
| JJ | 59.3 | 275 | 9.05 |
| KK | 43.2 | 213 | 24.5 |
| LL | 19.5 | 202 | 28.0 |
| MM | 15.1 | 183 | 34.1 |
| NN | 4.00 | 101 | 10.3 |
| OO | 0.069 | 38.7 | 21.9 |
| PP | 61.8 | 277 | 9.05 |
| QQ | 59.3 | 275 | 9.05 |
| RR | 45.0 | 344 | 15.4 |
| SS | 43.2 | 342 | 15.4 |
| TT | 20.3 | 250 | 3.54 |
| UU | 19.5 | 248 | 3.54 |
| VV | 15.8 | 223 | 148 |
| WW | 15.8 | 223 | 6.07 |
| XX | 15.1 | 221 | 6.07 |
| YY | 9.34 | 321 | 7.37 |
| ZZ | 8.96 | 320 | 7.37 |
| AB | 4.15 | 230 | 10.3 |
| AC | 4.00 | 230 | 10.3 |
| AD | 1.10 | 107 | 11.6 |
| AE | 1.06 | 106 | 11.6 |

FIG. 6B

SOLAR THERMAL POWER PLANTS

This is a National Phase Application filed under 35 U.S.C. 371 as a national stage of PCT/IL2008/001220, filed Sep. 11, 2008, an application claiming the benefit under 35 USC 119 (e) U.S. Provisional Application No. 60/960,016 filed on Sep. 11, 2007, the content of each of which is hereby incorporated by reference in its entirety.

FIELD OF THE INVENTION

This invention relates to solar thermal power plants, and in particular, to solar thermal power plants which provide thermal energy to steam-electric power generating plants.

BACKGROUND OF THE INVENTION

Amid concerns over global warming, and forecasts of both the depletion of non-renewable energy sources and rising power demand, suppliers of energy are increasingly seeking alternative primary sources of energy. One such source of energy is solar energy, and one way of utilizing solar energy is with a solar thermal power plant.

One type of solar power plant utilizes a "radiation concentrator collector" which concentrates the solar radiation by focusing it onto a smaller area, e.g., using mirrored surfaces or lenses. In this system, a reflector, which is typically parabolic, receives and reflects (focuses) incoming solar radiation onto a radiation absorber, which is formed as a tube. The tube radiation absorber is concentrically surrounded by a treated glass enclosure tube to limit the loss of heat. The collector system further includes means to track the sun.

To minimize the loss of heat through convection and conduction and to improve the solar radiation collection efficiency, the space between the tube radiation absorber and the glass enclosure tube is evacuated to very low pressure.

The tube radiation absorber is made of metal with a coating having a high solar radiation absorption coefficient to maximize the energy transfer imparted by the solar radiation reflecting off the reflector. A thermal fluid constituting a heat transport medium, which is typically a liquid such as oil, flows within the tube radiation absorber.

The thermal energy transported by the thermal fluid is then is used to power a steam-electric power plant to drive one or more turbines, in order to generate electricity in a conventional way, e.g., by coupling the axle of each of the turbines to a generator.

The thermal fluid powers the steam-electric power plant by transferring thermal energy thereto. Although the steam-electric cycle is more efficient at high temperatures, at a particular high temperature threshold, some thermal fluids may dissociate or otherwise break down or become less effective at transferring heat. Accordingly, such solar thermal energy generating plants are typically limited to operate at temperatures below this threshold, which for some thermal fluids may be in the region of about 400° C.

SUMMARY OF THE INVENTION

According to another aspect of the present invention, there is provided a solar thermal power plant comprising a solar collection system and a steam-electric power plant, wherein the solar collection system comprises one or more tube radiation absorbers containing a thermal fluid therewithin, the system being configured to heat said thermal fluid by passing the thermal fluid through said one or more tube radiation absorbers while said absorbers are irradiated with solar radiation, either direct, reflected, or both; the steam-electric power plant comprises an intermediate-pressure steam turbine, a low-pressure steam turbine, and at least one additional steam turbine having an inlet pressure which is higher than that of the intermediate-pressure steam turbine, and piping containing a working fluid; each turbine being associated with and connected upstream thereof to a heat exchange system adapted to transfer heat from said thermal fluid to said working fluid.

According to some embodiments, the thermal fluid may be thermal oil or steam/water.

According to other embodiments, the working fluid may be molten salts, carbon dioxide, or helium.

The solar collection system may further comprise trough collectors, which may be, e.g., single-axis sun-tracking parabolic reflectors or linear Fresnel collectors.

The working fluid of the steam-electric power plant may be steam/water.

The solar thermal power plant may have an operating temperature below about 400° C.

The heat exchange system associated with the additional steam turbine may comprises three heat exchangers, a first being a pre-heater, a second being an evaporator, and a third being a super-heater.

The solar thermal power plant may comprise one additional turbine, wherein the inlet pressures of the additional turbine, the intermediate-pressure turbine, and the low-pressure turbine are about, respectively, 150 bar, 100 bar, and 20 bar.

The thermal power plant may have a gross Rankine efficiency which is substantially or exceeds 42%.

The solar thermal power plant may further comprise a controller adapted to control distribution of the thermal fluid to each of the heat exchange systems such that the efficiency of the plant is optimized.

The tube radiation absorbers may be disposed within evacuated transparent tubes, at least within the solar collection system.

The heat exchange system associated with the intermediate-pressure turbine may constitute a first reheater, and the heat exchange system associated with the low pressure turbine may constitute a second reheater.

According to a further aspect of the present invention, there is provided a solar thermal power plant as described in connection with either one of the above aspects and/or any of the associated embodiments, wherein the thermal fluid is heated to a temperature not exceeding approximately 400° C. Consequently, the operating temperature of the steam-electric power plant does not exceed approximately 400° C.

According to a still further aspect of the present invention, there is provided a method for generating power comprising, the method comprising:
  (a) extracting power from a working fluid by expanding the working fluid serially in at least three turbine stages, wherein prior to each of the expansion stages the working fluid is heated to a predetermined temperature associated with the corresponding stage; and
  (b) converting the extracted power into electrical power;

wherein the working fluid is heated by means of heat transfer from a thermal fluid, and wherein the thermal fluid is previously heated by passing the thermal fluid through one or more tube radiation absorbers while the absorbers are irradiated with solar radiation, either direct, reflected, or both.

The tube radiation absorbers may constitute a portion of a solar collection system of a solar thermal power plant comprising the solar collection system and a steam-electric power plant.

The solar collection system may further comprise trough collectors, which may be single-axis sun-tracking parabolic reflectors or linear Fresnel collectors.

The working fluid of the steam-electric power plant may be water/steam.

The heat exchange system associated with the additional steam turbine may comprises three heat exchangers, a first being a pre-heater, a second being an evaporator, and a third being a super-heater.

The solar thermal power plant may comprise one additional turbine, wherein the inlet pressures of the turbines are 150 bar, 60 bar, and 20 bar.

The thermal power plant may have a gross Rankine efficiency which approaches or exceeds 42%.

The solar thermal power plant may further comprise a controller adapted to control distribution of the thermal fluid to each of the heat exchange systems such that the efficiency of the plant is optimized.

The heat exchange system associated with the intermediate-pressure turbine may constitute a first reheater, and the heat exchange system associated with the low pressure turbine may constitute a second reheater.

The tube radiation absorbers may be disposed within evacuated transparent tubes.

The thermal fluid may have a maximum operating temperature of about 400° C.

Generating power in accordance with either of the above aspects is associated with inter alia, the following features:
- by using thermal oil to supply heat for the reheat cycles, the distribution thereof is permitted a flexibility which allows for increased control of the temperature of the working fluid of the plant;
- thermal oil can be transported over greater distances than other heat sources (e.g., flue gasses from a coal-fired plant);
- the rate of flow of the thermal fluid can be increased, e.g., to return thermal fluid to be exposed to solar radiation at a higher temperature (for example, when less solar radiation is available);
- even though the operating temperature of such a plant is relatively low, the loss of efficiency which would normally be associated with a low operating temperature is offset by the fact that the running costs of providing thermal fluid which had been heated by solar radiation are reasonable relative to the efficiency gained; thus, the cost benefit of providing an addition turbine and a second reheat cycle can be realized, even at the relatively low operating temperatures associated with a solar power plant comprising tube radiation absorbers; and
- efficiency is increased significantly, and cost per kilowatt-hour of generated electricity is reduced.

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 3B is a table listing values of mass flow rate, enthalpy, temperature, pressure, and steam quality at different locations of the steam-electric plant indicated in FIG. 3A;

FIG. 6B is a table listing values of pressure, temperature, and flow rate at different locations of the steam-electric plant indicated in FIG. 6A.

DETAILED DESCRIPTION OF EMBODIMENTS

Figure 1:
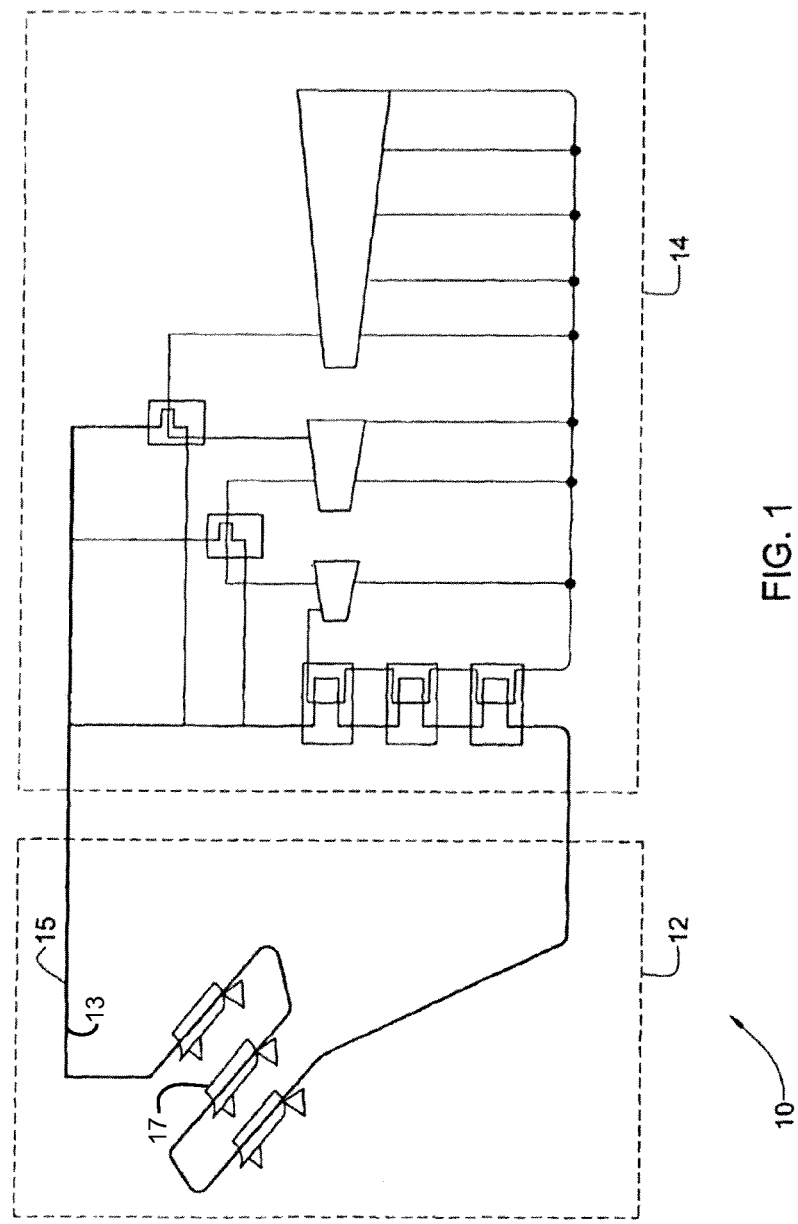
FIG. 1 is a schematic representation of a solar thermal power plant according to one embodiment of the invention.

As illustrated schematically in FIG. 1, there is provided a solar thermal power plant, which is generally indicated at 10, according to a first embodiment of the present invention. The plant 10 comprises a solar collection system 12 and a steam-electric power plant 14. The plant further comprises a heating circuit 13, which comprises one or more tube radiation absorbers 15 (which also constitute a portion of the solar collection system 12).

The solar collection system 12 comprises one or more tube radiation absorbers 15 and a plurality of trough collectors 17, such as single-axis parabolic reflectors. Alternatively, any suitable means for concentrating solar radiation, such as Fresnel collectors, may be provided. The tubes, including those which are not exposed to solar radiation, constitute a heating circuit of the plant 10. The tube radiation absorbers contain a thermal fluid therein, such as oil (phenyls) which are commercially available, such as under the trade name Therminol® VP-1. According to different embodiments, the thermal fluid may also be one of steam/water, molten salts, carbon dioxide, and helium. The thermal fluid, according to any of the embodiments, is heated within the tubes upon their exposure to direct and concentrated solar radiation. Thus, the thermal fluid is heated as it flows through the tube radiation absorbers 15. Reflectors, such as parabolic reflectors, may be provided in order to further heat the thermal fluid, as is well known in the art. The thermal fluid may be heated to a threshold upper temperature $T_{max}$, which may be chosen to be the highest safe working temperature for the thermal fluid, i.e., wherein the thermal fluid remains substantially stable and does not disintegrate or have its thermal properties adversely affected by the high temperature. In some embodiments, the threshold upper temperature $T_{max}$ may be about 400° C. (e.g., for Therminol® VP-1). Solar collection systems of this type are provided, inter alia, by Solel Solar Systems, Ltd. (Israel).

The thermal fluid is circulated, by means of suitable pumps (not shown) within the heating circuit 13, to provide a heat source to the steam-electric power plant 14.

Figure 2:
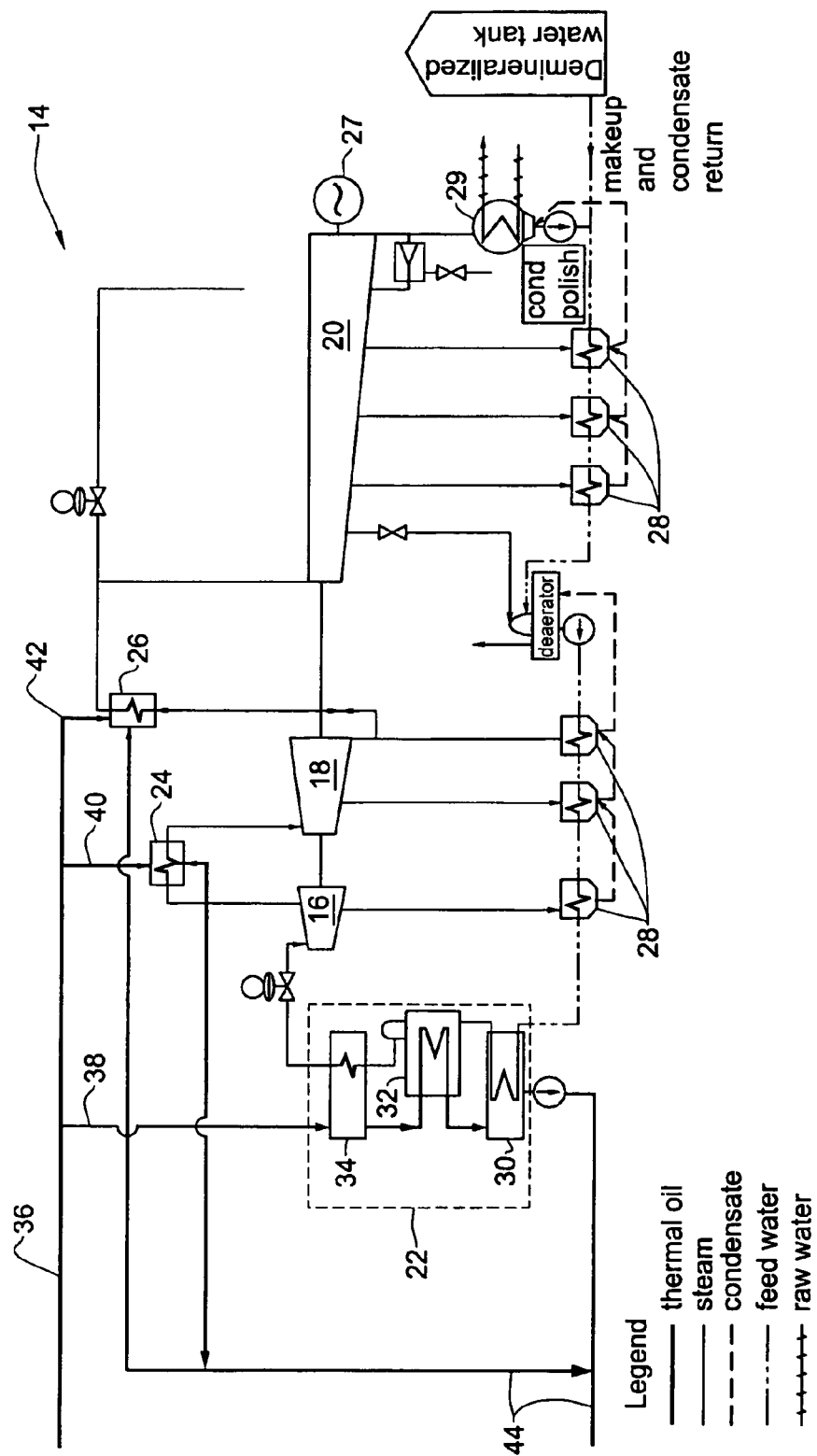
FIG. 2 is a schematic representation of an example of a steam-electric power plant, being part of the solar thermal power plant illustrated in FIG. 1.

As illustrated in FIG. 2, the steam-electric power plant 14 comprises three steam turbines 16, 18, 20, which may be part of a Rankine cycle. A first turbine 16 which is adapted to operate at a high pressure, a second turbine 18 which is adapted to operate at an intermediate pressure, and a third turbine 20 which is adapted to operate at a low pressure. According to one example, the first turbine 16 operates at an inlet pressure of about 150 bar, the second turbine 18 operates at an inlet pressure of about 60 bar, and the third turbine 20 operates at an inlet pressure of about 20 bar. In any event, the working pressures of the turbines may be selected to provide optimal efficiency and realistic mechanical materialization.

The three turbine casings are axially coupled to one another, and used to drive a single electrical generator 27, as is known in the art. Alternatively, the three turbines may be configured such that each turbine drives a separate generator (not illustrated). Each turbine 16, 18, 20 is associated with one of a first, second, and third heat exchange system 22, 24, 26, respectively, and receives working fluid (e.g., steam) therefrom. The first, second, and third heat exchange systems 22, 24, 26 are each in direct thermal communication with a part of the heating circuit, as will be described in greater detail below, and each heat the working fluid previous to its being received by its associated turbine. Each heat exchange system is located upstream of its associated turbine 16, 18, 20, and heats the working fluid previous to its being received by its associated turbine.

In addition, the steam-electric power plant 14 comprises other elements typically found in steam-electric power plants, such as for example a plurality of feedwater heaters 28, appropriate piping/conduits to carry working fluid, such as steam/water, at required temperature and pressure conditions, and at required flow rates, suitable sensors (not shown) to monitor temperature, pressure and mass flow rate at various locations in the steam-electric power plant 14, a suitable plant control system (not shown), etc.

Each of the heat exchange systems 22, 24, 26 is in direct thermal communication with the tube radiation absorbers 15, or in indirect thermal communication with the tube radiation absorbers 15, via a second thermal fluid that is in thermal communication with the tube radiation absorbers 15, and the heat exchange systems.

The first heat exchange system 22 constitutes a steam generation train, and comprises three heat exchangers, so that the working fluid can reach the elevated temperature and pressure required to optimally drive the first turbine 16: a pre-heater 30, an evaporator 32, and a super-heater 34. Each of the other heat exchange systems 24, 26 may comprise a single heat exchanger, and function as first and second reheaters; respectively.

A non-limiting example illustrating a one possible use of the solar thermal power plant 10 described above, will be given below. Values of the states of the working fluid and thermal fluid at various locations within the plant are presented in FIG. 3A with reference to the table in FIG. 3B, as part of the non-limiting example. The efficiency of the system can be calculated in a known way using these values. In order to reach these values, it was assumed that the steam turbines act reasonably close to an isentropic manner. In addition, condenser pressures, electro-mechanical losses in the generator, pressure loss in piping, temperature differences in heat exchangers, and pumps efficiencies were assumed to be consistent with those generally obtained in practiced.

In operation of the plant 10, the thermal fluid may be heated within the solar collection system 12 to its threshold upper temperature $T_{max}$, such as for example approximately 400° C., or 395° C. The thermal fluid enters an inlet distribution manifold 36, which is part of the circuit 13, from where it splits and flows into three distribution lines 38, 40, 42. Each of the distribution lines is preferably thermally insulated to prevent heat loss, and carries thermal fluid at temperature at or close to threshold upper temperature $T_{max}$ to one or another of the three heat exchange systems 22, 24, 26. Thus, the thermal fluid serves as the heating fluid within the heat exchangers of the heat exchange systems. The circuit 13 also comprises three collection lines corresponding to distribution lines 38, 40, 42, and a collection manifold 44, which carries the thermal fluid back to the solar collection system 12 to be reheated.

The cycle of solar heating of the thermal fluid, and thermal transfer of this heat to the working fluid of the steam/electric plant via the heat exchange systems, can continue indefinitely, as desired, absent malfunctions, etc. It will be appreciated that the relative distribution of the thermal fluid with respect to each of three distribution lines 38, 40, 42 may be configured in a manner such as to maximize the overall efficiency of the plant 10.

One or more controllers (not shown) may be provided to monitor to entrance conditions of the working fluid to each of the turbines, as well as the conditions of the thermal fluid in strategic locations, and to adjust the distribution of the thermal fluid three distribution lines 38, 40, 42 in real time in response to the working conditions of the system, for example, in order to maximize the efficiency thereof. In addition, the controllers ensure that the temperature/pressure conditions of the working fluid are such as to ensure that the working fluid does not condense within the turbines.

The thermal fluid traverses the first heat exchange system 22 as follows:
  (a) The thermal fluid which is carried directly from the solar collection system 12 via the first distribution line 38 enters the super-heater 34 heat exchanger and serves as the hot fluid thereof.
  (b) The thermal fluid, upon exiting the super-heater 34, then enters the evaporator 32 heat exchanger at a lower temperature and serves the hot fluid therefor.
  (c) The thermal fluid, upon exiting the evaporator 32, then enters the pre-heater 30 heat exchanger at an even lower temperature, and serves as the hot fluid therefor.
  (d) The thermal fluid, upon exiting the pre-heater 30, is carried to the collection manifold 44 and then returns to the solar collection system 12, where it is reheated.

Figure 3A:
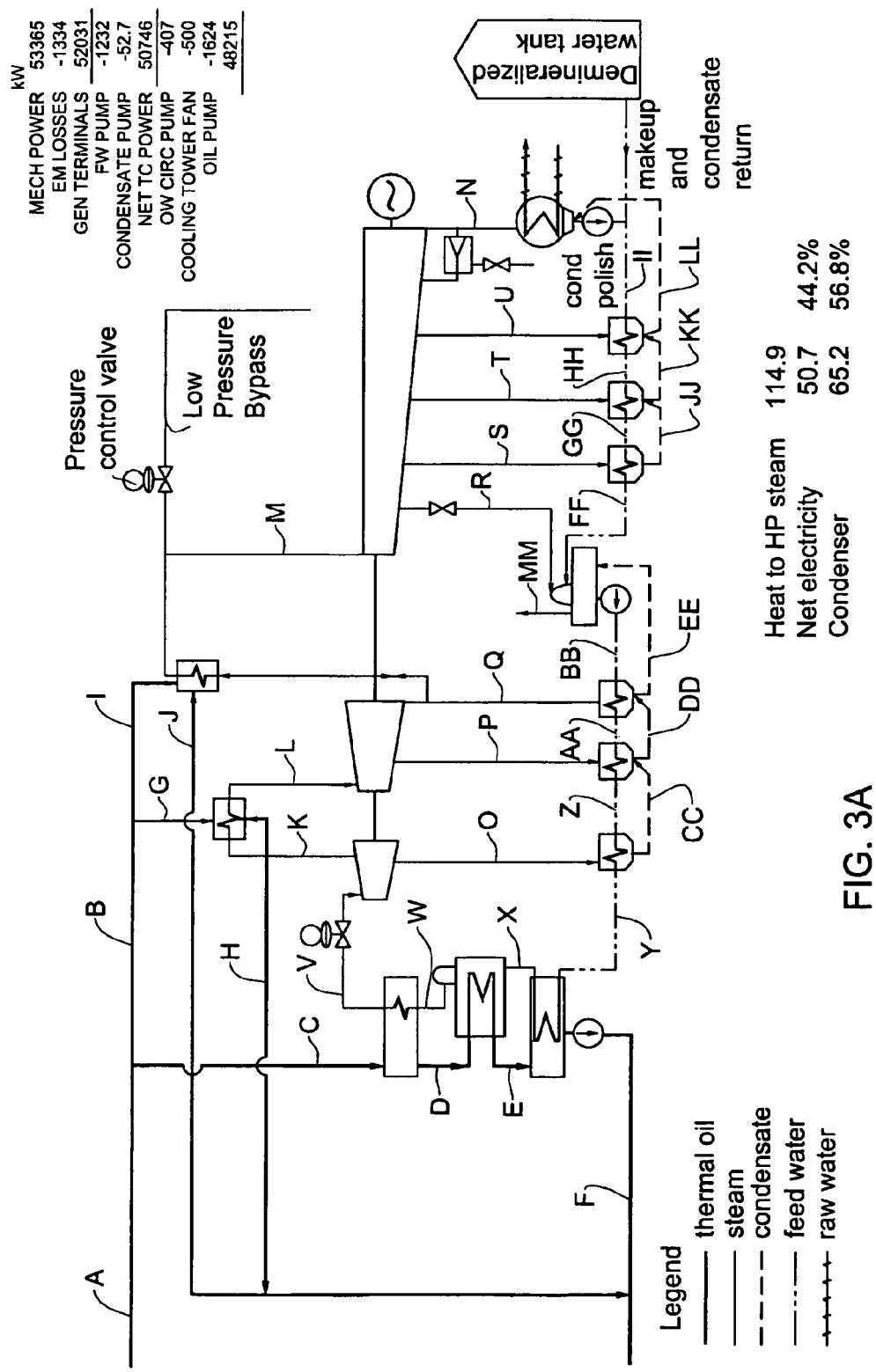
FIG. 3A is a schematic representation of the steam-electric power plant illustrated in FIG. 2, showing, together with the table in FIG. 3B, information on the state of working fluid thereof at different points in the operating cycle.

Concurrently with the above, working fluid of the steam-electric power plant 14 traverses the first heat exchange system in the reverse order:
  (a) Working fluid enters the pre-heater 30 heat exchanger, serving as the cold fluid thereof.
  (b) The working fluid leaves the pre-heater 30 heat exchanger at an elevated temperature, and is carried to the evaporator 32 heat exchanger, where it is evaporated. As a result of this heating, the temperature of the thermal fluid is lowered, as described in step (c) above.
  (c) The working fluid leaves the evaporator 32 as saturated vapor, and is carried to the super-heater 34 heat exchanger, where it is heated further. As a result of this heating, the temperature of the thermal fluid is lowered, as described in step (b) above.
  (d) The working fluid, upon exiting the super-heater 34, is carried to the first turbine 16 at a high temperature and pressure, e.g., as indicated in FIGS. 3A and 3B, and is used to drive it.

Subsequently, the working fluid exits the first turbine 16, and enters the second heat exchange system 24, which constitutes a first re-heater, as the cold fluid. Thermal fluid from the second distribution line 40 at or close to threshold upper temperature $T_{max}$ serves as the hot fluid in the heat exchanger of the second heat exchange system 24. Thermal fluid which exits the second heat exchange system 24 is carried to the collection manifold 44, joining the thermal fluid which exited the first heat exchange system 22 as described above, from where it is carried back to the solar collection system 12 for reheating. The working fluid exits the second heat exchange system 24 and enters the second turbine 18 at an elevated temperature and pressure, but at a pressure which is less than that which than that used to drive the first turbine 16. For example, working fluid at a temperature of 377° C. and 60 bar may be used to drive the second turbine 18.

Subsequently, the working fluid exits the second turbine 18, and enters the third heat exchange system 26, which constitutes a second re-heater, as the cold fluid. Thermal fluid from the third distribution line 42 at or close to threshold upper temperature $T_{max}$ serves as the hot fluid in the heat exchanger of the third heat exchange system 26. Thermal fluid which exits the third heat exchange system 26 is carried back to the solar collection system 12, is carried to the collection manifold 44, joining the thermal fluid which exited the first and second heat exchange systems 22, 24 as described above, from where it is carried back to the solar collection system 12 for reheating. The working fluid exits the third heat exchange system 26 and enters the low-pressure turbine 20 at an elevated temperature, but at a pressure which is less than that which than that used to drive the first and second turbines 16, 18. For example, working fluid at a temperature of 379° C. and 17.35 bar may be used to drive the low-pressure turbine 20. Upon exiting the low pressure turbine 20, the working fluid is condensed by a condenser 29 before re-entering the heat exchange system 22.

In addition to the above, a quantity of working fluid (e.g., steam/water) may be bled from of some or all of the turbines 16, 18, 20, and supplied to the feedwater heaters 28. This steam/water may be used to pre-heat the condensate from the condenser 29.

Figure 4:
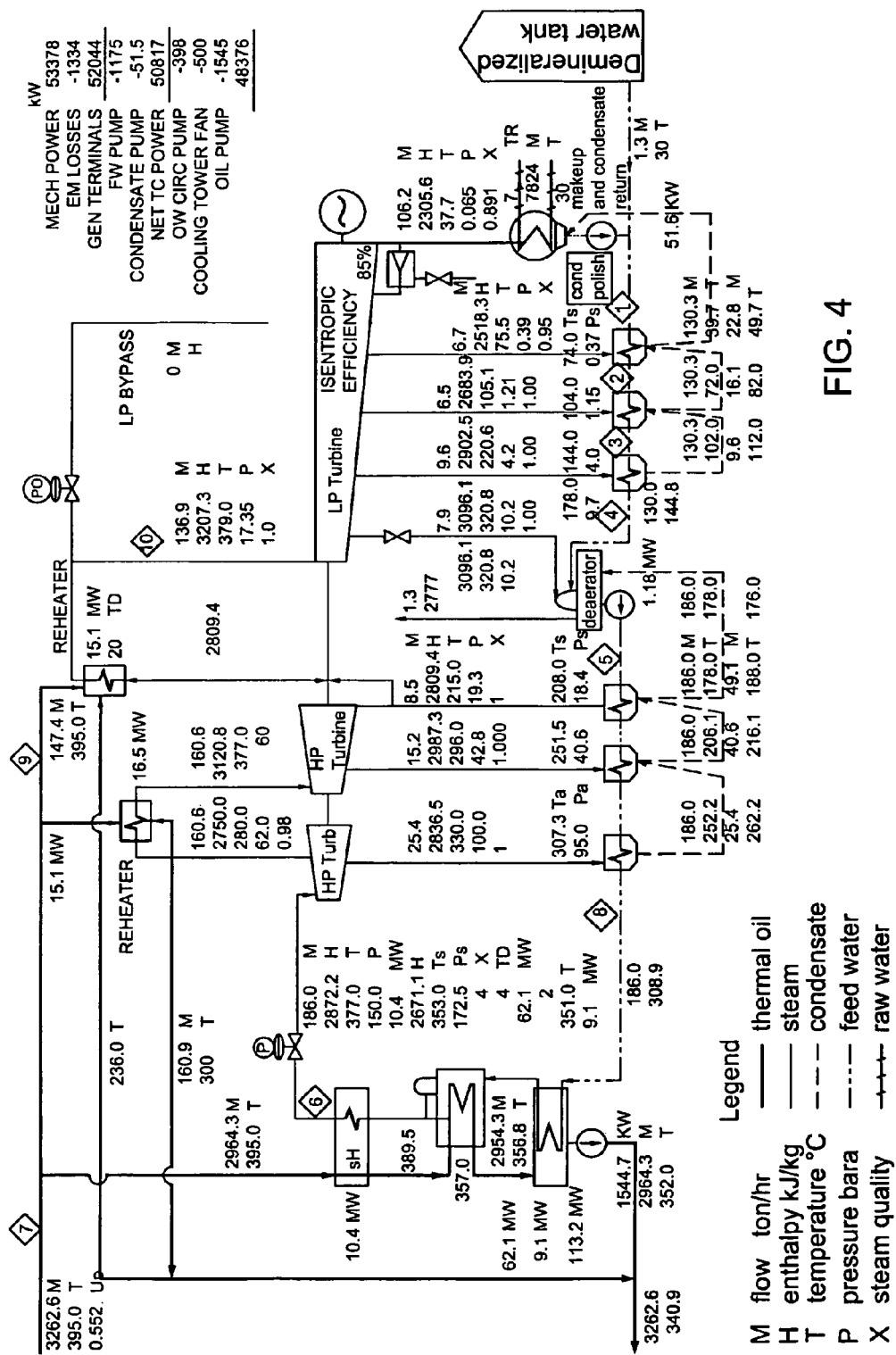
FIG. 4 is a heat balance diagram of the steam-electric power plant illustrated in FIG. 2.

As can be seen, the power plant as described above, in which the conditions thereof are in accordance with example values provided in FIG. 3A with reference to the table in FIG. 3B, as well as in FIG. 4, can be designed to have a theoretical Rankine efficiency of up to or more than 42%, such as 42.3% in the present example, while having a relatively low operating temperature of below about 400° C., which is a typical operating temperature for a steam-electric power plant which uses solar tube-radiation absorbers as a heat source. It is to be noted that a reference solar power plant which is designed as per this embodiment, but modified to operate optimally with only one re-heat (i.e., two turbines), yields a lower Rankine efficiency, e.g., about 38.4%.

Figure 5:
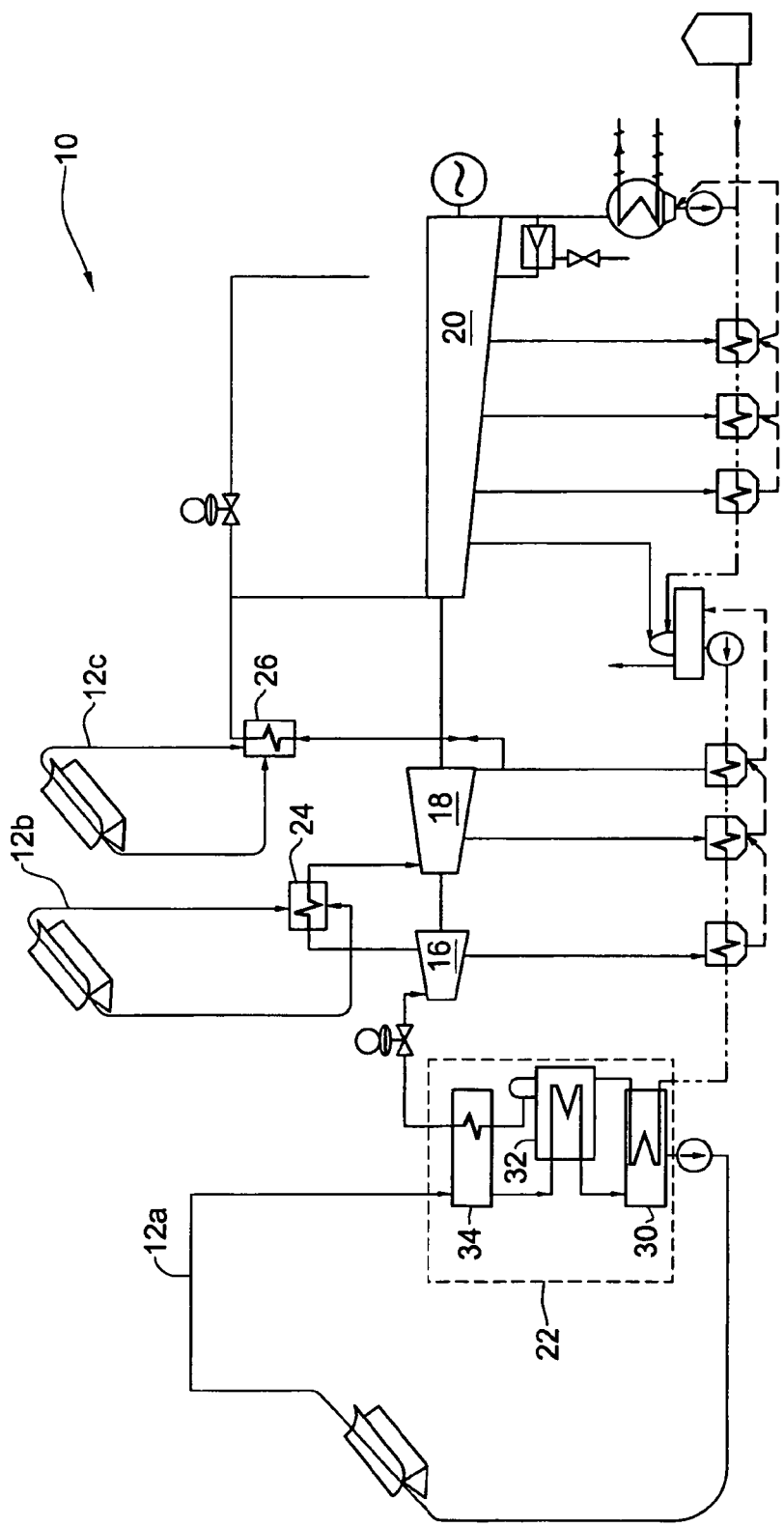
FIG. 5 is a schematic representation of a solar thermal power plant according to another embodiment of the invention.

A second embodiment of the present invention is illustrated in FIG. 5 and comprises all the elements and features of the first embodiment described above, mutatis mutandis, with the main difference that in the second embodiment there are independent solar collection system 12a, 12b, 12c rather than the single solar collection system of the first embodiment. According to this embodiment, each of the heat exchange systems 22, 24, 26 may receive thermal fluid from an independent solar collection system 12a, 12b, 12c, respectively. The tube radiation absorbers of the solar collection systems 12a, 12b, 12c are thus in fluid isolation from one another. However, they may be located physically near each one another.

According to the second embodiment, it is also possible to provide heat to each of the heat exchangers 22, 24, 26, at the same high temperature $T_{max}$, and thus may require less mass flow of heated thermal liquid to provide the required heat transfer for each heat exchanger. Accordingly, the required infrastructure for providing the heat to the heat exchangers may be simpler and require less pumping power than in the first embodiment.

The second embodiment may also comprise other features and/or advantages. For example, if one of the solar collection systems 12a, 12b, 12c, needs to be shut down, for example due to malfunction or maintenance, it may be possible for the associated turbine to be shut down, and to provide a bypass flow channel to channel the working fluid between the two remaining turbine, and thus permit operation of the plant 10 using these two turbines, albeit at a lower efficiency. Since there are no fuel related running costs for the solar collection systems, it may still be worthwhile to run the plant at the lower efficiency temporarily.

Optionally, any two or all of the solar collection systems 12a, 12b, 12c, may be interconnected by means of suitable conduits and valves to enable the same to be in selective fluid communication when desired, in any desired combination, and thus enable thermal fluid to be exchanged between them so that they may operate effectively in a similar manner to the solar collection system of the first embodiment, mutatis mutandis, for example. Alternatively, such a configuration may enable thermal fluid from two of the solar collection systems 12a, 12b, 12c, to also provide heat to the other turbine when its associated solar collection system is switched off.

Another example of a the solar thermal power plant 10 described above, will be given below is illustrated in FIG. 6A, with values of the states of the working fluid and thermal fluid at various locations therewithin the plant being presented in the table in FIG. 6B. The efficiency of the system can be calculated in a known way using these values. In order to reach these values, it was assumed that the steam turbines act reasonably close to an isentropic manner. In addition, condenser pressures, electro-mechanical losses in the generator, pressure loss in piping, temperature differences in heat exchangers, and pumps efficiencies were assumed to be consistent with those generally obtained in practiced.

Figure 6A:
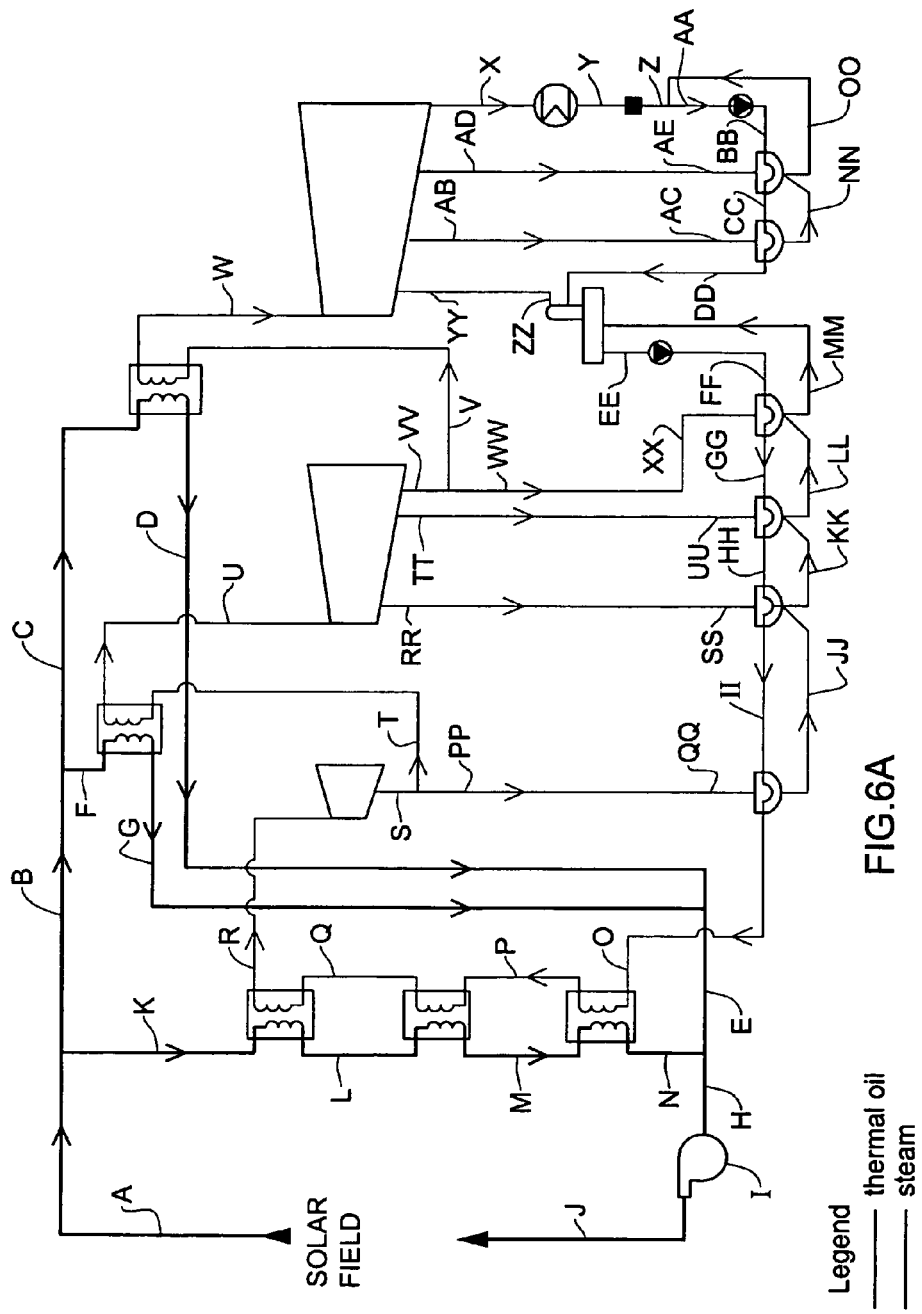
FIG. 6A is a schematic representation of a further example of a steam-electric power plant, as part of the solar thermal power plant illustrated in FIG. 1.

It will be noted that in the example illustrated in FIGS. 6A and 6B, several pipes have two different sets of values listed. This is to take pressure and temperature losses within the pipe. It will be appreciated that those values noted closer to the upstream portion of the pipe are the initial values within the pipe, and those values noted closer to the downstream portion of the pipe are the final values within the pipe.

In the specific example present in FIGS. 6A and 6B, a gross efficiency of substantially 42.51% may be achieved, with a net efficiency of substantially 36.56%. For reference, a similar system using only one, reheat may achieve a gross efficiency of substantially 39.79% and a net efficiency of substantially 35.08%. Thus, in the example presented in FIGS. 6A and 6B, increases in gross and net efficiencies of approximately 6.8% and 4.2%, respectively, may be realized.

Those skilled in the art to which this invention pertains will readily appreciate that numerous changes, variations and modifications can be made without departing from the scope of the invention mutatis mutandis. For example, the feedwater heater 28 connected to the first turbine 16 may be eliminated. The efficiency of the plant will still remain high, and the construction of the casing of first turbine 16 will be simplified.

The invention claimed is:

1. A method for generating power comprising:
   extracting power from a working fluid by expanding said working fluid serially in at least three turbine stages, wherein prior to each of said expansion stages the working fluid is heated in a respective heat exchange system to a predetermined temperature associated with the corresponding stage; and
   converting said extracted power into electrical power; wherein said working fluid is heated by means of heat transfer from a thermal fluid, and wherein said thermal fluid is previously heated by passing the thermal fluid through one or more tube radiation absorbers while said absorbers are irradiated with solar radiation; and
   wherein the heat exchange system associated with one of the at least three turbine stages comprises three separate heat exchangers, a first heat exchanger including a preheater, a second heat exchanger including an evaporator, and a third heat exchanger including a super-heater.

2. A method according to claim 1, wherein said tube radiation absorbers constitute a portion of a solar collection system of a solar thermal power plant comprising said solar collection system and a steam-electric power plant for carrying out the method of claim 16, said steam-electric power plant comprising an intermediate-pressure steam turbine, a low-pressure steam turbine, at least one additional steam turbine having an inlet pressure higher than that of the intermediate-pressure steam turbine, and piping containing said working fluid; each turbine being associated with a heat exchange system adapted to transfer heat from said thermal fluid to said working fluid.

3. The method according to claim 2, wherein said solar collection system further comprises trough collectors.

4. The method according to claim 3, wherein said trough collectors are selected from the group consisting of single-axis sun-tracking parabolic reflectors and linear Fresnel collectors.

5. The method according to claim 2, wherein the solar thermal power plant comprises one of said additional turbine, wherein the inlet pressures of the turbines are 150 bar, 60 bar, and 20 bar.

6. The method according to claim 2, wherein said solar power plant has a gross Rankine efficiency which exceeds 42%.

7. The method according to claim 2, wherein said solar thermal power plant further comprises a controller configured to control distribution of the thermal fluid to each of the heat exchange systems such that the efficiency of the plant is optimized.

8. The method according to claim 2, wherein the heat exchange system associated with the intermediate-pressure turbine constitutes a first reheater, and the heat exchange system associated with the low pressure turbine constitutes a second reheater.

9. The method according to claim 1, wherein said thermal fluid has a maximum operating temperature of about 400° C.

10. The method according to claim 1, wherein said thermal fluid is selected from the group consisting of thermal oil, steam/water, molten salts, carbon dioxide, and helium.

11. A solar thermal power plant comprising a solar collection system and a steam-electric power plant, wherein:
said solar collection system comprises one or more tube radiation absorbers containing a thermal fluid therewithin, said system being configured to heat said thermal fluid by passing the thermal fluid through said one or more tube radiation absorbers while said absorbers are irradiated with solar radiation; and
said steam-electric power plant comprises an intermediate-pressure steam turbine, a low-pressure steam turbine, at least one additional steam turbine having an inlet pressure higher than that of the intermediate-pressure steam turbine, and piping containing a working fluid; each turbine associated with a respective heat exchange system adapted to transfer heat from said thermal fluid to said working fluid;
wherein the heat exchange system associated with said at least one additional steam turbine comprises three separate heat exchangers, a first heat exchanger including a pre-heater, a second heat exchanger including an evaporator, and a third heat exchanger, including a super-heater.

12. The solar thermal power plant according to claim 11, wherein said thermal fluid is selected from the group consisting of thermal oil, steam/water, molten salts, carbon dioxide, and helium.

13. The solar thermal power plant according to claim 11, wherein said solar collection system further comprises trough collectors.

14. The solar thermal power plant according to claim 13, wherein said trough collectors are selected from the group consisting of single-axis sun-tracking parabolic reflectors and linear Fresnel collectors.

15. The solar thermal power plant according to claim 11, said solar thermal power plant having an operating temperature below about 400° C.

16. The solar thermal power plant according to claim 11, comprising one said additional turbine, wherein the inlet pressures of said additional turbine, said intermediate pressure turbine and said low pressure turbine are about 150 bar, 60 bar, and 20 bar respectively.

17. The solar thermal power plant according to claim 11, having a gross Rankine efficiency of at least substantially 42%.

18. The solar thermal power plant according to claim 11, further comprising a controller adapted to control distribution of the thermal fluid to each of the heat exchange systems such that the efficiency of the plant is optimized.

19. The solar thermal power plant according to claim 11, wherein the heat exchange system associated with the intermediate-pressure turbine constitutes a first reheater, and the heat exchange system associated with the low pressure turbine constitutes a second reheater.

20. A solar thermal power plant comprising:
a solar collection system including single access sun tracking parabolic reflectors and one or more tube radiation absorbers configured to collectively gather heat energy when irradiated by solar radiation;
the one or more tube radiation absorbers configured to transfer the gathered heat into a thermal fluid as it passes through the one or more tube radiation absorbers; and
a steam-electric power plant including multiple heat exchange systems, including at least a low-pressure steam turbine, an intermediate-pressure steam turbine, and one additional steam turbine having an inlet pressure higher than that of the intermediate-pressure steam turbine;
wherein each heat exchange system comprises a steam turbine and a working fluid containing in associated piping; and
wherein the heat exchange systems are configured to transfer heat energy from the thermal fluid into the respective working fluids; and
wherein the heat exchange system associated with said additional steam turbine comprises three separate heat exchangers, a first heat exchanger including a pre-heater, a second heat exchanger including an evaporator, and a third heat exchanger including a super-heater.

* * * * *